March 7, 1939.  H. SHAPIRO ET AL  2,149,873
POWER TRANSMISSION DEVICE
Filed Dec. 11, 1934   2 Sheets-Sheet 1

INVENTORS
Henry Shapiro
Isaac Joffe
BY Mock & Blum
ATTORNEYS.

March 7, 1939.  H. SHAPIRO ET AL  2,149,873
POWER TRANSMISSION DEVICE
Filed Dec. 11, 1934   2 Sheets-Sheet 2

INVENTORS
Henry Shapiro
Isaac Joffe
BY
Mock & Blum
ATTORNEYS.

Patented Mar. 7, 1939

2,149,873

UNITED STATES PATENT OFFICE 2,149,873

POWER TRANSMISSION DEVICE

Henry Shapiro, New York, and Isaac Joffe, Brooklyn, N. Y.; said Shapiro assignor to said Joffe Application December 11, 1934, Serial No. 756,916

4 Claims. (Cl. 192—17)

This invention relates to a new and improved power transmission device.

One of the objects of the invention is to provide a new and improved combination motor and clutch device, which can be used as a power transmission device for any purpose.

Another object of the invention is to provide a unit of this type which can be used conveniently for driving individual sewing machines, or other individual pieces of apparatus.

Another object of the invention is to provide a combined electric motor and clutch device, in which the rotor of the motor is permitted to idle, until the transmission device becomes operative.

Other objects of the invention will be set forth in the following description and drawings, which illustrate preferred embodiments thereof.

Figure 1:
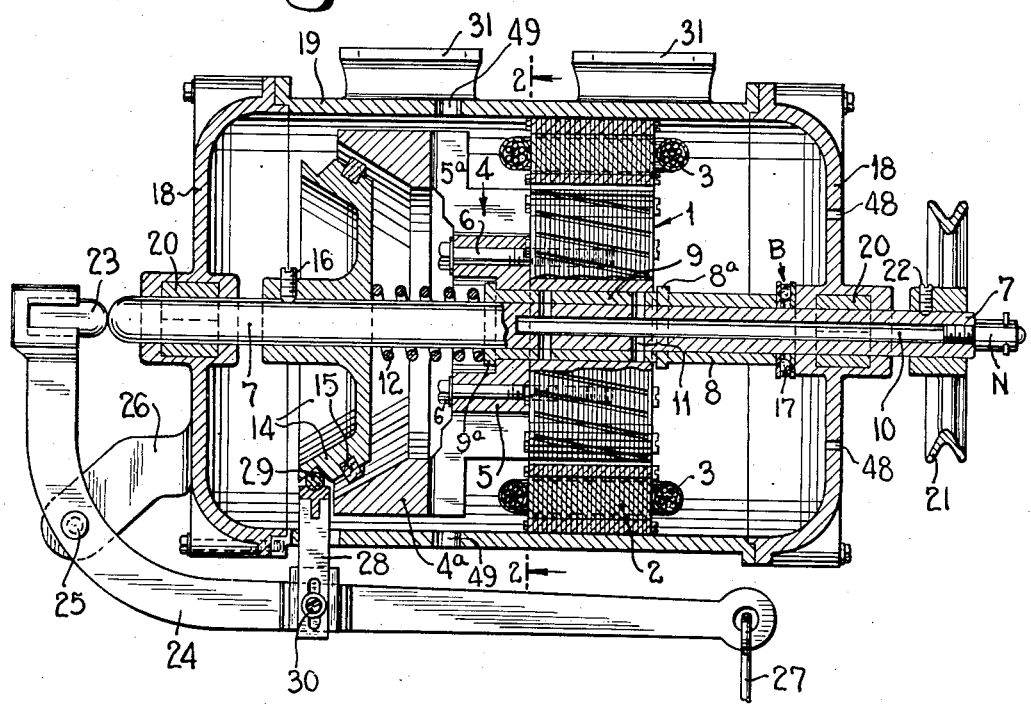
Fig. 1 is a sectional view, partially in elevation, illustrating one embodiment of my invention.
Figure 2:
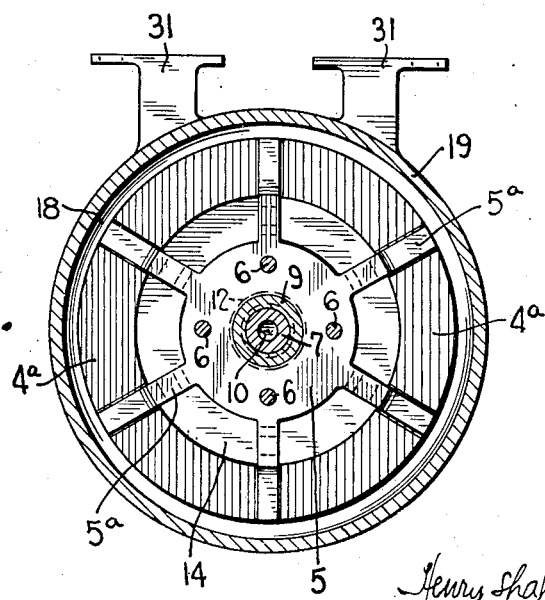
Fig. 2 is a sectional view through the line 2—2 of Fig. 1.

Referring to Fig. 1 and Fig. 2, the device is located within a suitable casing 19, having end caps 18, which are secured to the body of the casing in any suitable manner.

A shaft 7 is mounted, so that said shaft can be moved to and fro in the direction of its longitudinal axis. For this purpose, the end caps 18 are provided with bearings 20. At its outer end, the shaft 7 is provided with a pulley 21, which is connected to said shaft by means of a set screw or other suitable holding device 22. The sewing machine or other mechanism which is to be operated, can be provided with a belt which is connected to the driving pulley 21.

In order to lubricate the device, the shaft 7 is provided with an internal recess or bore 10 at one end thereof, and a lubrication nipple N of the usual type is located at the outer end of the bore 10.

Grease or other lubricant can be forced into the bore 10, and said longitudinal bore 10 communicates with transverse bores 11. A pair of sleeves 8 and 9 are mounted upon the exterior of the shaft 7. These sleeves 8 and 9 turn in unison with the shaft 7.

As shown in Fig. 1, the sleeve 9 has bores or openings which communicate with bores 11 of shaft 7, so that the inner sleeve surface of the rotor is well lubricated.

The sleeve 9 is provided at one end with a head 8a, and the sleeve 9 is provided at one end with a head 9a. The right hand end of the sleeve 9 abuts the read 8a. The sleeve 8, at its right hand end, abuts an end thrust bearing B, which is provided with anti-friction members 17 of any suitable type. Said end-thrust bearing is of the usual type, having one plate abutting or fixed to the adjacent cap 18, and another plate which is freely turnable with sleeve 8. It is not necessary to fix the right-hand plate of the end-thrust bearing to cap 18, and said bearing may be slid into position.

The rotor 1 is located in the usual manner with reference to the stator 2, and the field coils 3 are conventionally shown.

A female clutch member 4 has an end 4a which is provided with the usual internal tapered face. Said member 4a is intergral with radial arms 5a, which project from a hub 5. Said hub 5 is connected to the rotor 1 by means of suitable bolts 6. Hence the female clutch member 4 and the rotor turn in unison.

The male clutch member 14 is provided with the usual friction ring 15, and said member 14 is connected to the shaft 7, by one or more set screws 16 or the like.

The rotor 1 has a sleeve construction at its inner face, and this sleeve fits turnably upon the sleeve 9. The shaft 7 is bodily shiftable in the direction of its longitudinal axis, by means of the shift member 24, which is pivoted at 25 to an arm 26 which is connected to the adjacent end cap 18. The shift member 24 is provided with a lug or separate member 23, which abuts the adjacent end of the shaft 7. A coil spring 12 is mounted upon the shaft 7, and said spring abuts the adjacent walls of the male clutch member 14, and of the head 9a. This pressure of spring 12 yieldingly maintains the sleeves 8 and 9 in the relative position shown in Fig. 1, and the heads 8a and 9a prevent any longitudinal shifting of the rotor and of its associated hub 5. The radial arms 5a are shaped so as to act as fan-members, so that air is drawn into the casing through holes 48 which are provided in only one of the caps 18. The air current cools the rotor and said current of air is forced out through a circumferential series of holes 49, and to a slight extent through the hole provided for brake arm 23.

According to this construction, the rotor can turn freely or idle on sleeve 9, when the clutch is inoperative. When the shift member 24 is operated, the shaft 7 is moved in the direction of its longitudinal axis, until the friction ring 15 of the male clutch member is pressed against the internal tapered surface of the female clutch member 4a. This longitudinal movement is rather slight, so that the simultaneous longitudinal shifting of the pulley 21 does not affect the belt transmission. When the clutch is coupled, the shaft 7 is turned in unison with the rotor. The shift member 24 has a brake member 28 adjustably connected thereto by means of the clamping screw 30. The brake 28 is provided with a brake-shoe 29, which normally is pressed against the outer surface of the male clutch member 14. The link 27 is used for pulling down the adjacent end of the shift member 24, thus turning the same in the clockwise direction around the pivot 25. Hence the brake is released from the male clutch member, as the same is shifted, together with the shaft 7, until the clutch is operative. The sleeves 8 and 9 are not keyed to the shaft 7. However, the pressure which is produced by the spring 12 against the sleeves, when the clutch member 14 is in the operative position, may cause a certain frictional binding between said sleeves 8 and 9 and the member 14, so that the sleeves 8 and 9 and the spring 12 then turn in unison with the shaft 7.

The end thrust bearing B prevents the binding of said sleeves, so that they can turn freely in unison with shaft 7. The casing 19 is provided with brackets 31, by means of which it can be connected to the underside of the sewing machine or power bench or other means.

Figure 3:
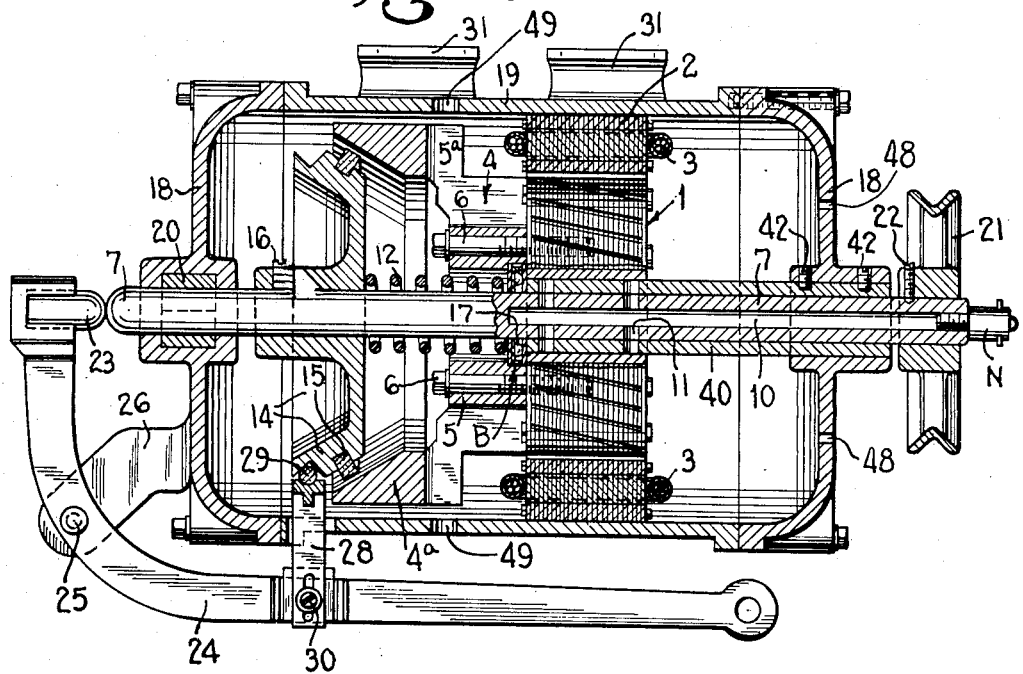
Fig. 3 is a view similar to Fig. 1, showing a second embodiment of the invention.

In the embodiment shown in Fig. 3, the casing 19 has the construction shown in Fig. 1. Fig. 3 also shows a structure, in which the shaft 7 is turnable, and it is also longitudinally movable in the direction of its longitudinal axis. A sleeve 40 is mounted in a suitable bore or opening of one of the caps 18, and said sleeve 40 is connected to said adjacent cap 18, by means of screws or other fastening devices 42. The shaft 7 and sleeve 40 are provided with lubricating means, of the type previously described. This lubrication system permits the interior sleeve surface of the rotor 1, to turn freely relative to the sleeve.

In the embodiment shown in Fig. 3, the end thrust bearing B is located in the hub 5. The end thrust bearing is of the usual type, having plates. The hub 5 is not connected to the adjacent thrust-bearing plate, and the sleeve 40 is likewise not rigidly connected to the adjacent plate. The pressure spring 12 keeps the plates in proper position, and the end thrust bearing also acts as a stop-collar to prevent any substantial lateral movement of the rotor when it is coupled to the shaft. While the rotor is idling, both plates of the end-thrust bearing B remain stationary, since there is a slight lateral play between the walls of the recess of hub 5, and the plates of the end-thrust bearing. When shaft 7 is shifted, pressure is applied by the male clutch member to the female clutch member and to hub 5, so that the left-hand wall of the recess in hub 5, presses against the left-hand plate of the end-thrust bearing. Likewise spring 12 is then compressed so that it exerts additional pressure against the thrust-bearing, so that the right-hand plate thereof is pressed against the end of stationary sleeve 40. Hence when the rotor turns, while the clutch is engaged, the left-hand plate turns in unison with the rotor and the right-hand plate does not turn, because it is pressed against sleeve 40.

In this embodiment, spring 12 turns with shaft 7, when the rotor is coupled to the shaft.

Figure 4:
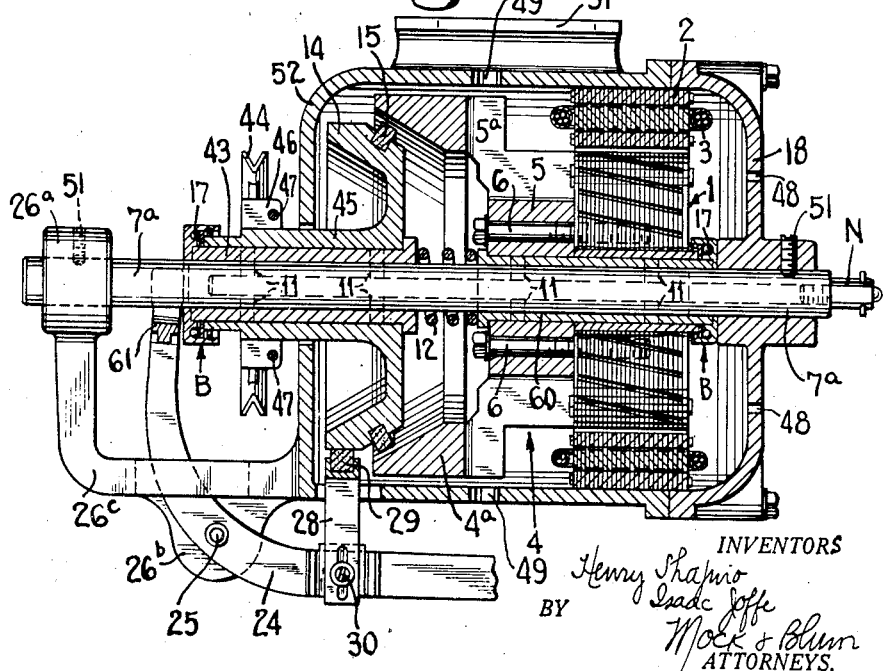
Fig. 4 is a view similar to Fig. 1 and Fig. 3, showing a third embodiment of the invention.

In the embodiment shown in Fig. 4, a stud-shaft 7a is provided and it is non-turnable. Said stud-shaft 7a is rigidly connected to the casing 52, so that it is not movable in any direction relative to the casing. At one end, the stud-shaft 7a is connected to the single end cap 18, by means of a clamping screw 51 or the like. The casing 52 is also provided with an arm or bracket 26c, and this bracket 26c has a sleeve 26a through which the adjacent end of the stud-shaft passes. This sleeve 26a is also provided with a clamping screw or screws 51, which engage the adjacent end of the stud-shaft 7a.

The sleeve 60 is mounted upon the stud-shaft 7a without being fixed thereto, and the inner sleeve surface of the rotor 1, is mounted upon said sleeve 60. An end-thrust bearing B of the usual type is provided in this embodiment at the right-hand end of the rotor. Said bearing is mounted upon sleeve 60. In this embodiment, the shift member 24 is pivotally mounted at 25, to a lug 26b of the arm or bracket 26c. Said shift member is provided with a fork 61, which presses against the adjacent end of a second or supplemental end-thrust bearing B. The hub 45 of the male clutch member 14, is mounted upon the sleeve 43, which is non-turnably mounted upon the stud-shaft 7a. The spring 12 abuts the inner or adjacent ends of sleeves 43 and 60. Lubricating means of the type previously described are provided, to permit the free axial movement of sleeve 43, the free turning of hub 45 and the free turning of rotor 1 on sleeve 60.

In this embodiment, when the shift member is operated, the sleeve 43 and the male clutch member 14 are shifted in unison, until the clutch members are coupled.

When the sleeve 43 is shifted the spring 12 is compressed. The sleeve 60 is not moved longitudinally when sleeve 43 is shifted, so that the shifting does not affect the free turning of rotor 1. The end or longitudinal pressure on male clutch member 14 is taken up by the end-thrust bearing on sleeve 43, so that the sleeve 43 can remain non-turning while the male clutch member and its hub 45 turn on sleeve 43. The pressure of the shift member does not hinder the free turning of the male clutch member. The split drive pulley 44 has a two-part hub 46, the parts of which are connected by fastening members 47 so that said pulley is firmly connected to hub 45. Hence the sleeves 43 and 60 can remain non-turning when the clutch is operative or inoperative. The spring 12 remains stationary in this embodiment. Hence, in all the embodiments, the spring 12 is free from torque, when the clutch is coupled. The spring 12 either turns in unison with the clutch, or said spring remains stationary.

When the male clutch member is pressed against the female clutch member, in the embodiment of Fig. 4, pressure is exerted on hub 5 and on the rotor, in the right-hand direction. This pressure is taken up by the associated end-thrust bearing on sleeve 60. There is a slight longitudinal clearance (in the direction of the axis of stud-shaft 7a) between the inner-sleeve surface of the rotor and its bearing on sleeve 60, so that when the clutch is coupled, the rotor can turn without turning sleeve 60. The pressure of spring 12 exerts a braking effect on sleeve 60, so that it does not turn. The spring 12 may be under a certain compression, in all the embodiments, while the rotor is idling.

The clutch per se represents a power-transmission device which can be replaced by any other type of coupling or power-transmission device. The end-thrust bearing B on sleeve 60 prevents any binding between the rotor 1 and said sleeve 60, during the period that the clutch is operative, and the rotor is therefore subjected to end-thrust.

It will be noted that in all the embodiments the motor and the clutch are almost completely enclosed in a casing so that the parts are protected from dust and dirt. However, the casing may be of skeleton construction if desired, so as to substantially enclose the parts to the extent necessary to protect the operator. The pulley and belt drive can be suitably enclosed in any well known manner so that the operator is protected from all the moving parts of the power unit.

Whenever we refer to a clutch in the claims it is to be understood that we include any power transmitting device. The pulley 21 may be designated as a power transmission element which is external to the casing.

Referring to Fig. 1 the sleeves 8 and 9 may be considered as forming a single bearing as the division of this bearing into two sleeves is for convenience of assembly. For example, in assembling the device, the left-hand cap 18 which is shown in Fig. 1 can be removed, the sleeve 8 can be slid into position, the rotor 1 and the sleeve 9 and the member 4 can then be assembled external to the casing and slid into position, and the male clutch member 14 can then be connected to the shaft 7. If desired the male clutch member 14 can be connected to the shaft 7 while said male clutch member is external to the casing 19.

The cap 18 can be then slid into the position shown in Fig. 1. Likewise, and if it is desired to inspect or repair the device, the left-hand cap 18 can be removed, the pulley 21 and the nipple N can be removed, and the shaft 7, together with all the assembled parts can then be slid out of the casing.

Referring to Fig. 4 the cap 18 which is at the right-hand side of the casing 52 can be removed, the fastening member or members 51 can be removed, the split pulley 44 can be removed from the hub 45 and the shaft 7a, together with all the assembled parts can then be removed as a sub-assembly from the casing.

It will be noted that the left-hand wall of the casing 52 has a small opening so that the left-hand thrust bearing B can be slid through the same, but this opening is too small to permit any substantial entrance of dirt or the like.

It will be noted that when the rotor is idling, there are minimum wear and power consumption, because the shaft then remains stationary, because the rotor then turns on its independent bearing. Likewise, the unit can be lubricated from a single point.

The shaft 7 or the shaft 7a may be designated as a supporting-shaft, since it supports the weight of the rotor, even though a bearing may be located between the rotor and said supporting shaft. Since the rotor can turn relative to its supporting shaft, there is minimum power loss when the device is idling. Likewise, the rotor can turn relative to said bearing, if a bearing is used.

The member 7 which is shown in Figs. 1–3, and the member 7a which is shown in Fig. 4, may be designated as the primary rotor-support. That is, while the rotor is mounted directly upon the sleeve 9 which is shown in Fig. 1, for example, said sleeve 9 is supported upon the member 7.

We have shown a preferred embodiment of our invention, but it is clear that numerous changes and omissions can be made without departing from its spirit.

I claim:

1. A power transmission unit comprising an electric motor having a rotor which is provided with a central opening, a shaft passing through said opening, a bearing located in said opening between said shaft and said rotor, said bearing being mounted on said shaft, a clutch having a first clutch member and a second clutch member, the first clutch member being connected to said rotor, the second clutch member being shiftable and being operatively connected to a power transmission element, a spring abutting said bearing and said second clutch member, means for shifting the second clutch member into operative relation against the force of said spring, said first-mentioned bearing having an end-thrust bearing between one end of said first-mentioned bearing and a part of the unit which is held against movement which could be produced by the force of said spring, in order to take up the force of said spring when the clutch is operative.

2. A power transmission unit comprising a casing, an electric motor and a motor shaft located within said casing, said shaft projecting through said casing at at least one end thereof, said unit comprising a power transmission element which is mounted externally to said casing, said motor having a hollow rotor in which the shaft is located, a bearing for said rotor so that said rotor can turn independently of said shaft, said bearing being located between the motor shaft and the rotor, means for lubricating said bearing so as to lubricate the inner surface of the rotor, a clutch located within said casing and adapted to couple said rotor to said power transmission element, and a movable member for controlling said clutch, said movable member being located external to said casing and having a brake member which projects through a wall of said casing.

3. A power transmission unit comprising an electric motor having a rotor mounted on a primary rotor support which passes through said rotor, a sleeve loosely mounted between said primary rotor support and said rotor, said sleeve being turnable relative to said rotor support, a first clutch member connected to the rotor, a second and turnably mounted clutch member which is mounted for longitudinal shifting movement relative to the first clutch member and which is operatively connected to a driven member, a spring normally holding said clutch members in separated and operative relation, one end of said spring abutting said sleeve.

4. A power transmission unit comprising an electric motor having a rotor mounted on a primary rotor support which passes through said rotor, a first sleeve loosely mounted between said rotor and said primary rotor support, said first sleeve passing through said rotor, means to supply lubricating material between said primary rotor support and said first sleeve, a first clutch member connected to the rotor, a second and turnably supported clutch member which is mounted for longitudinal shifting movement relative to the first clutch member and operatively connected to a driven member, a second sleeve which is turnable relative to said second clutch member and located between said second clutch member and said primary rotor support, a spring normally holding said clutch members in separated and inoperative relation, said spring being located between said clutch members, one end of said spring abutting said first sleeve and the other end abutting said second sleeve.

HENRY SHAPIRO.
ISAAC JOFFE.